United States Patent
Wilkins et al.

(10) Patent No.: US 8,323,831 B2
(45) Date of Patent: Dec. 4, 2012

(54) NANOCOMPOSITE ELECTRODES AND RELATED DEVICES

(75) Inventors: Ronnie Wilkins, Melrose, MA (US); Antoni S. Gozdz, Marlborough, MA (US); Hung-Chieh Shiao, Sudbury, MA (US)

(73) Assignee: A123 Systems, Inc., Waltham, MA (US)

( * ) Notice: Subject to any disclaimer, the term of this patent is extended or adjusted under 35 U.S.C. 154(b) by 284 days.

(21) Appl. No.: 11/515,633

(22) Filed: Sep. 5, 2006

(65) Prior Publication Data

US 2010/0075225 A1 Mar. 25, 2010

Related U.S. Application Data

(60) Provisional application No. 60/713,649, filed on Sep. 2, 2005.

(51) Int. Cl.
*H01M 4/13* (2010.01)
(52) U.S. Cl. .......... 429/217; 429/209
(58) Field of Classification Search .......... None
See application file for complete search history.

(56) References Cited

U.S. PATENT DOCUMENTS

| | | | |
|---|---|---|---|
| 4,578,326 A | 3/1986 | Armand et al. | |
| 4,732,825 A | 3/1988 | Kamata et al. | |
| 4,957,833 A | 9/1990 | Daifuku et al. | |
| 5,047,133 A | 9/1991 | Allen | |
| 5,074,648 A | 12/1991 | Warszawski et al. | |
| 5,108,855 A | 4/1992 | Daifuku et al. | |
| 5,302,274 A | 4/1994 | Tomantschger et al. | |
| 5,399,477 A * | 3/1995 | Maskasky ............... | 430/567 |
| 5,423,110 A | 6/1995 | Gauthier et al. | |
| 5,437,692 A | 8/1995 | Dasgupta et al. | |
| 5,498,489 A | 3/1996 | Dasgupta et al. | |
| 5,498,490 A | 3/1996 | Brodd | |
| 5,510,212 A | 4/1996 | Delnick et al. | |
| 5,512,389 A | 4/1996 | Dasgupta et al. | |
| 5,518,839 A * | 5/1996 | Olsen ............... | 429/304 |
| 5,521,028 A | 5/1996 | Gauthier et al. | |
| 5,542,163 A | 8/1996 | Chang | |

(Continued)

FOREIGN PATENT DOCUMENTS

EP 1381097 1/2004

(Continued)

OTHER PUBLICATIONS

U.S. Appl. No. 11/396,515, filed Apr. 3, 2006, Chiang et al.

(Continued)

*Primary Examiner* — Maria J Laios
(74) *Attorney, Agent, or Firm* — Wilmer Cutler Pickering Hale and Dorr LLP

(57) ABSTRACT

A nanocomposite electrode that includes a current collector, an electroactive layer a conductive adhesive contacting the surface of the current collector and an interlayer region in electrical communication with the current collector and the electroactive material. The interlayer region is interposed between the current collector and the electroactive layer and includes a portion of the conductive adhesive intermixed with a portion of the electroactive layer. The electroactive layer includes electroactive material having a surface area of at least about 10 m²/g. The conductive adhesive may be at least partially soluble in electrode casting solvent. Electrochemical devices, such as lithium secondary cells, containing an electrode with an interlayer region are also provided, as are processes for making such electrodes and electrochemical devices.

66 Claims, 2 Drawing Sheets

U.S. PATENT DOCUMENTS

| | | | |
|---|---|---|---|
| 5,554,459 | A | 9/1996 | Gozdz et al. |
| 5,582,623 | A | 12/1996 | Chu |
| 5,824,120 | A * | 10/1998 | Mitchell et al. ............... 29/623.1 |
| 5,840,371 | A | 11/1998 | Warren |
| 5,965,296 | A | 10/1999 | Nishimura et al. |
| 6,007,588 | A | 12/1999 | Mitchell |
| 6,030,421 | A | 2/2000 | Gauthier et al. |
| 6,046,268 | A | 4/2000 | Ochoa et al. |
| 6,136,471 | A | 10/2000 | Yoshida et al. |
| 6,159,635 | A | 12/2000 | Dasgupta et al. |
| 6,168,885 | B1 * | 1/2001 | Narang et al. ................ 429/214 |
| 6,252,762 | B1 | 6/2001 | Amatucci |
| 6,277,522 | B1 | 8/2001 | Omaru et al. |
| 6,280,882 | B1 | 8/2001 | Vallee et al. |
| 6,316,140 | B1 | 11/2001 | Hatazawa et al. |
| 6,316,149 | B1 | 11/2001 | Garbe et al. |
| 6,319,630 | B1 | 11/2001 | Hasegawa et al. |
| 6,391,069 | B1 | 5/2002 | Gozdz et al. |
| 6,413,667 | B1 | 7/2002 | Gozdz |
| 6,423,447 | B1 | 7/2002 | Ohsaki et al. |
| 6,444,355 | B1 | 9/2002 | Murai et al. |
| 6,458,483 | B1 | 10/2002 | Hamano et al. |
| 6,465,125 | B1 | 10/2002 | Takami et al. |
| 6,465,126 | B1 | 10/2002 | Jannasch et al. |
| 6,475,670 | B1 | 11/2002 | Ito et al. |
| 6,503,657 | B1 | 1/2003 | Takami et al. |
| 6,503,856 | B1 | 1/2003 | Broadway et al. |
| 6,517,972 | B1 | 2/2003 | Amatucci |
| 6,527,955 | B1 | 3/2003 | Sun |
| 6,555,266 | B1 * | 4/2003 | Woodnorth et al. .......... 429/164 |
| 6,589,690 | B1 | 7/2003 | Sato et al. |
| 6,605,390 | B1 | 8/2003 | Moore et al. |
| 6,680,148 | B2 | 1/2004 | Jan et al. |
| 6,692,543 | B1 | 2/2004 | Hamano et al. |
| 6,699,623 | B1 | 3/2004 | Dai |
| 6,727,021 | B1 | 4/2004 | Shiota et al. |
| 6,815,121 | B2 | 11/2004 | Dasgupta et al. |
| 6,815,123 | B2 | 11/2004 | Sun |
| 6,887,511 | B1 | 5/2005 | Shima et al. |
| 6,998,193 | B2 | 2/2006 | Sun |
| 7,033,702 | B2 | 4/2006 | Dasgupta et al. |
| 2004/0005265 | A1 * | 1/2004 | Chiang et al. ................. 423/306 |
| 2004/0096741 | A1 * | 5/2004 | Goto et al. .................... 429/217 |
| 2004/0111873 | A1 * | 6/2004 | Okawa et al. ................ 29/623.1 |
| 2004/0234850 | A1 * | 11/2004 | Watarai et al. ................ 429/217 |
| 2005/0233219 | A1 | 10/2005 | Gozdz et al. |

FOREIGN PATENT DOCUMENTS

| | | |
|---|---|---|
| JP | 2003-109581 A | 4/2003 |
| WO | WO 02/084764 * | 10/2002 |
| WO | WO-03012908 | 2/2003 |
| WO | WO-03056646 A1 | 7/2003 |
| WO | WO-2004068618 | 8/2004 |

OTHER PUBLICATIONS

International Search Report, International Application No. PCT/US06/34481, mailed Aug. 12, 2008 (9 Pages).

European Search Report for European Patent Application No. 06851818.2 mailed Apr. 19, 2011. 8 pages.

* cited by examiner

NANOCOMPOSITE ELECTRODES AND RELATED DEVICES

FIELD OF THE INVENTION

This invention relates to non-aqueous electrolyte secondary cells and electrodes. In particular, the invention relates to a lithium-containing electrode having nanoscale electroactive material and a current collector coated with a conductive adhesive.

BACKGROUND

A challenge in the construction of electrodes for electrochemical cells, such as those used in rechargeable batteries, is achieving a good electrical connection between the conductive elements of the electrode and the corresponding current collector. Current collectors are typically made of thin sheets of metal, such as aluminum. As part of forming the electrode, a calendaring process is employed in which the electrode material is pressed into the current collector. The high mechanical forces of the calendaring procedure result in particles of the electrode material becoming mechanically adhered to the current collector, essentially deforming the metal sheet and forming a mechanical interlock between the current collector and the remainder of the electrode.

U.S. patent Ser. No. 11/396,515, entitled "Nanoscale Ion Storage Materials", which is incorporated by reference in its entirety, discloses nanoscale materials useful for electrochemical cells. These materials have much smaller particle size, and correspondingly higher surface area, than conventional, coarse-grained electrode materials. The high surface to volume ratio or specific surface area, as well as their smaller crystalline dimensions, provide fundamentally different physical properties compared to their coarse-grained counterparts. Electrodes made with nanoscale materials pose new challenges in manufacturing, however. For example, the high-pressure calendaring process is insufficient in itself to achieve mechanical adherence of nanoscale electrode materials to the current collector. The material properties of slurries used in the preparation of composite electrode layers prepared from nanoscale materials are altered due to the smaller particle size. This difference, as well as the higher surface area of nanoscale materials, inhibits the formation of a mechanical interlock between the particles and the current collector during calendering. Thus, because of the altered material properties of nanoscale compositions, as well as the material's unique dimensions (i.e., lacking the macroscopic edges and points of conventional electrode materials), the particles cannot be pressed into the current collector to form the mechanical interlock achieved by larger-scale conventional materials.

Moreover, to achieve the desired rheology for coating the current collector surface, slurries of nanoscale electrode materials are necessarily more dilute (i.e., having a higher solvent fraction) than slurries made from larger-scale electrode materials. As these slurries dry, there is a tendency for the binder to separate from the current collector, resulting in less effective anchoring of the electrode to the collector, further impairing the electrical connection between the collector and the electrode material. In addition, the volume change during drying of such slurries is higher than slurries prepared from conventional larger-scale materials, raising the potential for undesired cracking and spalling of the electrode during drying.

Treatment of the current collector, such as through coatings, has focused on materials that are insoluble in the solvents used in the electrode manufacturing process. Prior to the invention described herein, soluble coatings or adhesives were considered undesirable because solubilization at the current collector-electrode interface was thought to result in the loss of adhesion between these two materials. Moreover, current collector coatings have the potential for reducing the electrical connectivity between the current collector and the electrode active material.

U.S. Pat. No. 5,554,459 provides a coating composition for the current collector of an electrode. The coating composition includes polyolefinic based compositions, such as poly(ethylene-co-acrylic acid) copolymers, all of which are not soluble in common electrode casting solvents (e.g., NMP). The coating composition separates the active material of the electrode from the current collector, potentially resulting in reduced electrical connectivity between the current collector and the active material of the electrode.

SUMMARY OF THE INVENTION

In one aspect, a nanocomposite electrode is provided. The electrode includes a current collector, an electroactive layer, a conductive adhesive contacting the surface of the current collector and an interlayer region interposed between the conductive adhesive layer and the electroactive layer. The electroactive layer includes electroactive material having a surface area of at least about 10 $m^2/g$. The interlayer region is in electrical communication with the current collector and the electroactive layer and includes a portion of the conductive adhesive intermixed with a portion of the electroactive material.

In another aspect, a nanocomposite electrode includes a current collector, an electroactive layer, and a conductive adhesive contacting the surface of the current collector. The electroactive layer includes electroactive material having a surface area of at least about 10 $m^2/g$ and is cast in a solvent-based composite. The conductive adhesive is at least partially soluble in the electrode casting solvent.

Electrochemical devices, such as lithium secondary cells and Li-ion batteries, containing an electrode with an interlayer region are also provided. Processes for making such electrodes and electrochemical devices are also provided.

BRIEF DESCRIPTION OF THE DRAWINGS

A more complete appreciation of the present invention and many of its advantages will be understood by reference to the following detailed description when considered in connection with the following drawings, which are presented for the purpose of illustration only are not intended to limit the scope of the appended claims, and in which:

DETAILED DESCRIPTION OF THE INVENTION

Figure 1:
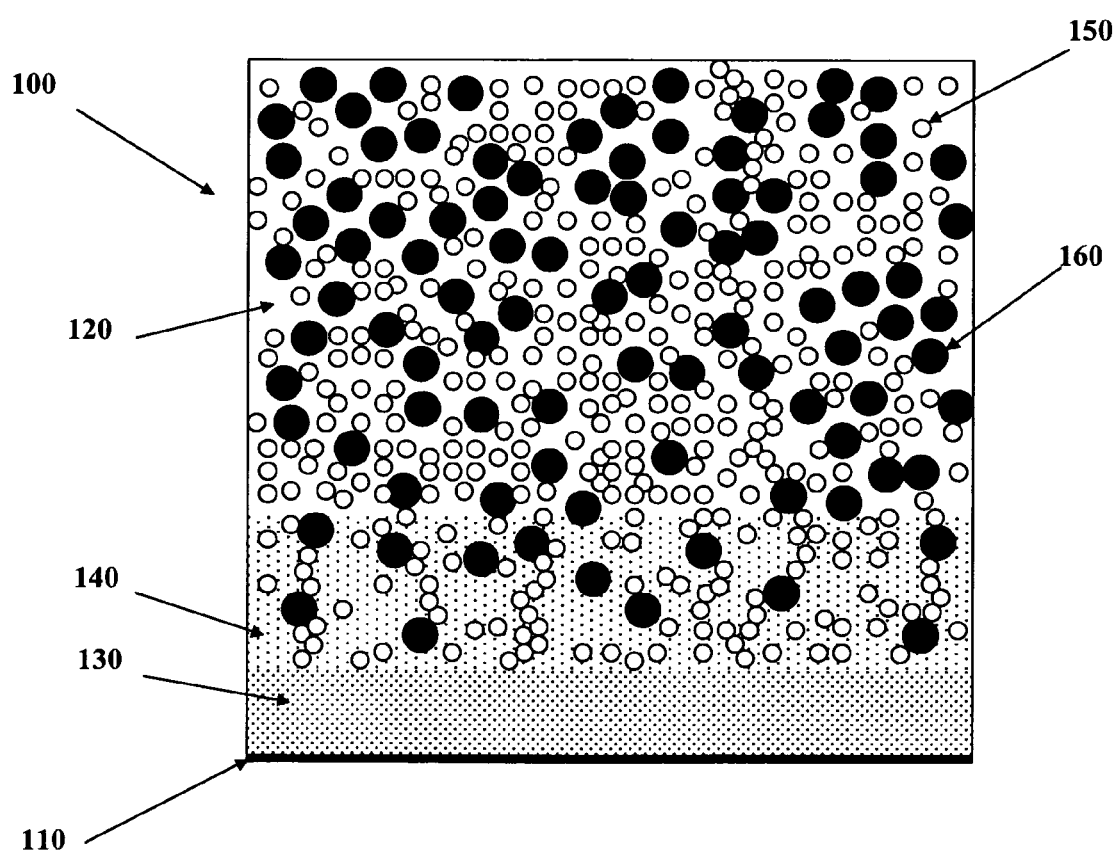
FIG. 1 is a representation of a nanocomposite electrode as described herein, including an interlayer region having a portion of the conductive adhesive intermixed with a portion of the electroactive material.

The electrochemical cells described herein include nanoscale electrode material. Electrical communication between nanoscale electrode material and the current collector is achieved by virtue of a conductive adhesive applied to the surface of the current collector. The electrochemical cells described herein include an interlayer region in electrical communication with the coated current collector and an electroactive layer. The electroactive layer includes the nanoscale electroactive material, a polymeric binder, and, optionally, a conductive additive. In some embodiments, the conductive adhesive includes conductive material and a polymer. The interlayer region includes a portion of the electroactive layer intermixed with a portion of the adhesive layer. For example, the interlayer region includes a portion of the nanoscale electroactive material in intimate contact with the polymer and/or conductive material of the conductive adhesive. In some embodiments, the binder and/or conductive additive of the electroactive layer is in intimate contact with a portion of the conductive adhesive in the interlayer. In some embodiments, the interlayer region is interposed between the coated current collector and the electroactive layer.

The inventors have surprisingly and counter-intuitively discovered that conductive adhesives that are soluble in electrode casting solvent result in improved adherence of the electrode material to the current collector, as well as improved electrical connection. As noted above, materials that are soluble in the solvents used for electrode assembly typically are not used as coating materials due to concerns about the stability of the adhesion layer and, ultimately, the device. In one or more embodiments in the preparation of the electrodes described herein, when the conductive adhesive comes into contact with the electrode slurry, the adhesive softens, allowing the nanoscale electroactive material, as well as other electrode components, to intermix with the conductive adhesive, forming an interlayer region that is characterized by the electrode material being in intimate contact with the conductive adhesive. This process results in a chemi-mechanical connection between the electrode material and the current collector, which heretofore was not possible using conventional calendaring techniques. The interlayer region is in electrical communication with the current collector and the electroactive material in the remainder of the electrode, thus resulting in unexpectedly improved electrical properties.

The inventors have further discovered that the electrode performance is improved as a result of the formation of the interlayer region. In particular, the inventors have surprisingly discovered that when the conductive adhesive is partially soluble in the electrode casting solvent, an interlayer region forms, resulting in the impedance of the device being lowered along with improved adhesion to the current collector. Without being bound to a particular theory, it is thought that the partial solubility of the conductive adhesive allows an intimate connection between the adhesive and the conductive materials of the cathode in the interlayer region. This intimate connection results in lower electrical resistance and, accordingly, lower impedance for the electrode and its associated device. In particular, when the cathode active material is comprised of nanoscale, or high surface area, material, the connection between the adhesive and the electroactive material in the interlayer region is further improved, resulting in even lower electrical impedance. In particular for nanoscale materials, where there are more points of contact for impedance to occur (by virtue of the high surface area), the high contact area that results from the solubility of the conductive adhesive improves the overall electrical resistance of the electrode.

In one or more embodiments, the electrodes of the present invention are made by preparing an electrode layer that permits rapid lithium diffusion throughout the layer. In some embodiments, a conductive additive is included with the active material of the electrode. The electrode and battery structures and materials of the invention follow the general methods and materials described in U.S. patent application Ser. No. 11/052,971, entitled "Lithium secondary cell with high charge and discharge rate capability" (corresponding to U.S. Patent Publication No. 2005/0233219), which is herein incorporated by reference.

In one or more embodiments, the electrode is manufactured by preparing a semi-liquid paste containing the electrode active compound homogeneously dispersed in a solution of a polymer binder in an appropriate casting solvent. The paste is applied to both sides of a current collector foil or grid that has been coated with a conductive adhesive. The applied positive electrode composition is then dried, forming the electroactive layer. Exemplary casting solvents include, without limitation, one or more of N-methylpyrrolidinone (NMP), gamma-butyrolactone ($\gamma$-BL), dimethylformamide, acetone, or any other solvent that is found, using procedures well-known to those skilled in the art, to dissolve or partially dissolve the conductive adhesive. A metallic substrate such as aluminum foil or expanded metal grid is used as the current collector. To improve the adhesion of the active layer to the current collector, a conductive adhesive, e.g., a thin carbon polymer intercoating, is applied to the current collector. The dried layers are calendared to provide layers of uniform thickness and density.

The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

The conductive adhesive may be a continuous coating or a partial coating (e.g., an interrupted pattern of spots, islands, dots, or lines). For example, in some embodiments, the coating covers about 20% to about 100% of the current collector surface by weight. In other embodiments, the coating covers about 20% to about 80%, about 30% to about 50% or about 40% to about 50% of the collector surface. In some embodiments, the coating covers at least 20%, at least about 30%, at least about 40% or at least about 50% of the collector surface. In some embodiments, the coating covers about 20%, about 30%, about 40%, about 50%, about 60%, about 70%, about 80%, about 90% or about 95% of the collector surface. The coating formed by the conductive adhesive may have a thickness between about 0.1 µm and about 20 µm, for example between about 0.1 µm and 10 µm, or between about 0.1 µm and about 5 µm. In some embodiments, the coating formed by the conductive adhesive may have a thickness less than about 20 µm, for example less than about 10 µm, or less than about 5 µm.

In one or more embodiments, as shown in FIG. 1, a nanocomposite electrode (100) includes a conductive interlayer region (140) interposed between an electroactive layer and a conductive adhesive (130). The electroactive layer includes electroactive material (150), a binder (120), and optional conductive additive (160). The conductive adhesive (130) is in contact with a current collector (110) and, in some embodiments, includes conductive material and polymer. The interlayer region (140) includes particles of the cathode active material (150) or optional conductive additives (160) from the electroactive layer intermixed with the components of the conductive adhesive (130) (e.g., conductive phase of the adhesive, as well as polymer), providing intimate contact that lowers the interface impedance. Thus, a portion of the electroactive layer and a portion of the conductive adhesive are intermixed with each other. In some embodiments, this intermixing results in electroactive material and conductive material becoming embedded in the interlayer region. In some embodiments, the nanocomposite electrode (100) is a cathode, while in other embodiments, the nanocomposite electrode is an anode.

While not being bound by any particular mode of operation, the interlayer region (140) shown in FIG. 1 is formed when the semi-liquid paste containing the electroactive compound in the casting solvent comes into contact with the current collector coated with the conductive adhesive. A semi-liquid paste including electroactive material (150), a binder (120), optional conductive additive (160) and casting solvent is applied to the coated current collector to form the electroactive layer.

When the adhesive (130) is soluble or partially soluble in the casting solvent, it softens, allowing interdiffusion of the electrode constituents and the conductive adhesive components, forming an interlayer region (140). Upon removal of the casting solvent, the interlayer region is in electrical communication with the current collector and the electrode and its conductive constituents. Other modes of manufacture that would achieve the interlayer described herein are also within the scope of the invention. The interlayer, as described herein, can also be formed by other modes of manufacture known to those of skill in the art.

While further not being bound by any particular mode of operation, this phenomenon has several benefits. Improved adhesion occurs as the electrode binder and the conductive adhesive intermix, allowing intimate physical contact between the compositions. It is thought that improved adhesion of the electrode to the current collector is achieved by virtue of chemical bonding and mechanical interlocking between the electrode and the adhesive (i.e., forming a chemi-mechanical bond). Particles of the cathode active material (150), e.g., cathode or anode active materials, or optional conductive additives (160) in the electroactive layer intermix with the conductive adhesive (130) and its components (e.g., conductive phase of the adhesive), providing intimate contact that lowers the interface impedance. Thus, in some embodiments, a portion of the electrode materials and a portion of the conductive adhesive are embedded in the interlayer region. The resulting interlayer region improves the surface contact between the cathode active layer and the current collector, thus achieving improved electrical connection and reduced electrical impedance. In addition, because the slurries of nanoscale electrode materials are more dilute than those of conventional materials, the volume change during drying is higher for nanocomposite slurries than for conventional slurries. It is thought that the interlayer region provides a compliant layer that will mitigate cracking and spalling of the electrode as it is further processed, further providing improved electrical performance.

In some embodiments, the interlayer region is characterized as a continuous gradient from the current collector to the electroactive layer. The concentration of the conductive adhesive and its components is highest at the portion of the region closest to the current collector, becoming progressively less concentrated at the interface with the electroactive layer. Similarly, the concentration of the electroactive layer is highest at the interface with the electroactive layer and the interlayer region, becoming progressively less concentrated at the interface with the current collector. In other embodiments, the interlayer forms a distinct layer between the current collector and the electroactive layer. In some embodiments, the adhesive does not include conductive material and, therefore, the intermixing of adhesive components and electroactive layer does not include intermixing of conductive material of the adhesive with the electroactive layer materials. In this embodiment, there is sufficient intermixing of the conductive components of the electroactive layer with the adhesive that they come into contact with the current collector, allowing for an electronic connection between the current collector and the remainder of the electrode. Alternatively, the conductive components of the electroactive layer come into contact with the current collector through voids in the adhesive coating.

The conductive adhesives of the invention include any material that is substantially soluble in the solvent used for casting the electroactive layer, as well as sufficient to promote adhesion between the current collector and the electrode. In addition to being substantially soluble in the casting solvent and having good adhesive properties, the conductive adhesive must be electrochemically stable. One nonlimiting example of a specific conductive adhesive includes, without limitation, conductive inks and Electrodag coating materials such as Electrodag 112 (Acheson, a National Starch and Chemical Company). Electrodag coating materials are aqueous mixtures of conductive material, solvent, and polymer. Exemplary solvents include, without limitation, alcohols (e.g., butoxyethanol). The polymers used in the conductive adhesive are any polymers known to those of skill in the art to be suitable as a conductive coating and are soluble in the electrode casting solvent. Exemplary polymers, include, without limitation, polyolefins, polyurethanes, polyacrylic acids, polyacrylic esters, polyethers, polyacrylates, polystyrene as well as their copolymers and terpolymers and mixtures thereof. In one embodiment, the polymer is an acrylic acid/ styrene co-polymer. In one embodiment, the polymer is acrylic acid, isobutyl acrylate styrene co-polymer. In some embodiments, the adhesive includes a mixture of polymers wherein one or more of polymers are not soluble in casting solvent; this is acceptable so long as the composition of the adhesive overall is soluble in the casting solvent. The conductive material is dispersed throughout the conductive adhesive and can form a conductive phase. For example, in some embodiments, the conductive material is dispersed in an aqueous suspension of the conductive adhesive. In other embodiments the conductive material is dispersed in an organic solvent containing the conductive adhesive. Exemplary conductive materials include carbon black, natural and artificial graphite, partially graphitized coke, carbon fiber, acetylene black, vapor grown carbon fiber ("VGCF"), fullerenic carbon nanotubes, other carbon nanotubes, fine metal powders, and fine powders of highly conductive compounds such as metal carbides and metal nitrides. Examples of specific conductive materials include, without limitation, Super S, Super P, Ensaco 350, KS-6 and SFG-6 carbons available from Timcal Belgium N.V. In one embodiment, the adhesive is applied by spray coating. In some cases, the conductive adhesive is applied by gravure, micro gravure, slot die, or other coating methods known to those experienced in the art.

A conductive adhesive is considered to be soluble in electrode casting solvent if approximately 10-90 weight percent of the adhesive is extractable into the solvent. In some embodiments, approximately 75%, approximately 50%, approximately 30%, approximately 25%, approximately 15%, or approximately 10% of the adhesive is extractable into the solvent. Solubility can be tested for example by coating a surface (e.g., current collector film) with the adhesive and exposing the coated surface to solvent. After a predetermined period of time, the amount of adhesive remaining on the surface can be determined by art-recognized methods (e.g., gravimetric, after removing residual solvent from the surface). In some embodiments, the adhesive is exposed to the solvent only momentarily, for example less than about 1 minute, less than about 45 seconds, less than about 30 seconds, less than about 15 seconds, less than about 10 seconds, or less than about 5 seconds. In some embodiments, the adhesive is exposed to the solvent for a longer period of time, for example up to about 30 minutes, up to about 15 minutes, up to about 10 minutes, or up to about 5 minutes. In some embodiments, the adhesive is exposed to the solvent for about 1 to about 10 minutes, for example, for about 2 to about 7 minutes, or for about 3 to about 5 minutes. In some embodiments, the adhesive is exposed to the solvent at room temperature. In some embodiments, the adhesive is exposed to the solvent at elevated temperature effective to remove the solvent and dry the coating, for example at a temperature above the boiling point of the casting solvent, such as for example between about 60° C. and about 150° C. In some embodiments, the adhesive is exposed to the solvent at multiple temperatures. In one embodiment, solubility of the adhesive in the solvent is determined by wiping a cotton swab saturated with solvent across a surface coated with the adhesive. The coated surface is optionally pre-exposed to solvent. Solubility is confirmed if the swab is able to wipe a visible portion of the adhesive from the surface. Alternatively, in some embodiments, the weight percent of adhesive remaining after swabbing is calculated. In some embodiments, approximately 10-90 weight percent of the adhesive remains after swabbing. In some embodiments, approximately 75%, approximately 50%, approximately 30%, approximately 25%, approximately 15%, or approximately 10% of the adhesive remains after swabbing.

A positive electrode can have a thickness of less than 200 µm, e.g., between about 50 µm to 125 µm, or between about 80 µm to 100 µm on each side of the current collector, and a pore volume fraction between about 20 and 70 vol. %. The active material is typically loaded at about 3-5 mg/cm$^2$, about 10-20 mg/cm$^2$, or about 11-15 mg/cm$^2$. Generally, lower loadings (e.g., about 3-5 mg/cm$^2$) are employed for power formulations, while higher loadings about (e.g., about 10-20 mg/cm$^2$) are employed for energy formulations. In some embodiments, loadings higher than about 15 mg/cm$^2$ are employed.

The solids loading of the electrode is determined such that the desired viscosity is achieved for electrode coating, typically in the range of about 2-5,000 cps using a Brookfield viscometer. Electrode slurries composed of the nanoscale materials described herein and having a physical density of about 3.5 g/cc have solids loadings in the range of about 35% to about 45% by weight. In comparison, slurries composed of conventional coarse-grained active material with a physical density of about 5 g/cc have solids loadings ranging of about 70% by weight. Solvents such as NMP, water, acetone or others can be used at these loading levels to achieve the desired viscosity. Binders are selected such that proper solubility in the solvent and performance characteristics in the product are achieved. Binders based on PVDF are typically used for non-aqueous solvents and SBS for aqueous based solvents. Binder concentrations are typically in the range of about 1% to about 7% by weight. Optionally, conductive additives are included in the electrode at concentrations up to about 5% by weight to improve the conductivity within the electrode.

Typically, thicker electrode layers increase electrode impedance. However, the inventors have surprisingly discovered that the presence of an interlayer region of conductive adhesive and cathode active material reduces the electrical impedance of the electrode. It is thought that the lower resistance is due to the improved surface connection that results from the interlayer, which is formed as a result of the conductive materials being intermixed with in the adhesive. In some embodiments, the through electrode resistance for the electrodes described herein is as low as 10Ω for a 1 cm$^2$ area for a two-sided electrode that is 200 µm thick, with a 15 µm thick current collector. In some embodiments, the through electrode resistance is less than about 10Ω for 1 cm$^2$, in some cases less than 5Ω for 1 cm$^2$, and in some cases less than 2Ω for 1 cm$^2$. By way of comparison, in the absence of the interlayer region, the through-electrode resistance for the same electrode thickness and formulation is often not measurable since the electrode does not adhere, but is in any case greater than about 20Ω for a 1 cm$^2$ area.

The electrodes described herein include nanoscale ion storage materials, such as those described in U.S. patent application Ser. No. 11/396,515, entitled "Nanoscale Ion Storage Materials" and U.S. patent application Ser. No. 10/329,046, entitled "Conductive Lithium Storage Electrode" (Publication No. 2004/0005265), both of which are incorporated by reference in their entireties. In certain embodiments, the nanoscale material has a BET specific surface area greater than about 10 m$^2$/g, greater than about 20 m$^2$/g, greater than about 25 m$^2$/g, in some cases at least about 30 m$^2$/g, at least about 35 m$^2$/g, at least about 40 m$^2$/g, at least about 45 m$^2$/g, or at least about 50 m$^2$/g. For example, in some embodiments, the nanoscale material has a BET specific surface area of about 10 m$^2$/g, about 20 m$^2$/g, about 25 m$^2$/g, about 30 m$^2$/g, about 35 m$^2$/g, about 40 m$^2$/g, about 45 m$^2$/g, or about 50 m$^2$/g. As used herein, "BET" refers to the method of Brunauer, Emmett and Teller, well-known to those skilled in the art of powder characterization, in which a gas phase molecule (such as N$_2$) is condensed onto the surfaces of a material at a temperature (such as 77 K) where the coverage of condensed gas per unit area is well-known, and the total amount of condensed gas on the sample is then measured upon being liberated by heating.

For a given value of the BET specific surface area, and knowing the specific gravity of the material, it is also possible to calculate a corresponding "equivalent spherical particle size." This is the particle diameter that would result in the measured surface area if the material were in the form of identically sized spherical particles, and is a good approximation of the number-averaged or mean particle size if the particle shape is equi-axed. In some embodiments, the particle morphology of the nanomaterials used as electrode materials is nearly spherical, and the equivalent spherical particle size calculated from the BET specific surface area is very close to the average particle diameter directly observed by electron microscopy. Furthermore, the size of crystallites or primary particles, when the materials of the invention are crystalline, can be determined by X-ray line-broadening methods well known to those skilled in the art. Thus, in certain embodiments, the nanomaterials described herein have an average (i.e., mean) diameter of about 100 nm or less. In some instances, the average diameter is about 75 nm or less, for example, about 70 nm or less, about 60 nm or less, about 50 nm or less, about 45 nm or less, about 40 nm or less, or about 35 nm or less.

The unique properties of a nanomaterial may depend on the smallest cross-sectional dimension. Cross-sectional dimension is here understood to be that family of straight lines that can be drawn through the center of mass of an isolated or separable object. By assuming spherical morphology, the equivalent spherical particle size gives the largest average cross-sectional dimension of a particulate material. On the other hand, a very thin but continuous film, or a very thin but continuous fiber, can exhibit nanoscale effects, even though the dimensions are far larger than nanoscale in the plane of the film or along the axis of the fiber. However, if the smallest cross-sectional dimension, namely the thickness of the film or the diameter of the fiber, is sufficiently small, nanoscale properties may be obtained. Thus, in certain embodiments, for anisometric particles, such as nanorods, nanoplatelets, nanofibers or continuous thin films, the specific surface area and the equivalent spherical particle size may not adequately define the characteristic dimension below which the nanomaterial will exhibit special properties. That is, for highly anisometric particle shapes, in some instances the BET surface area can be larger than the above-mentioned values, yet the material still will exhibit a smallest characteristic dimension sufficiently small to exhibit nanoscale properties as described herein.

If particle morphology is well-known and uniform amongst particles in a sample (for instance, if the average size and aspect ratio of nanorods or nanoplatelets is known, or even if the distribution of such parameters is known), a specific surface area above which nanoscale behavior will be observed can be computed for a given particle shape. However, for simplicity, in at least some such embodiments, nanoscale behavior will be observed if the primary particles of the powder exhibit a smallest cross-sectional dimension that is, on a number-averaged basis to provide a mean value, about 500 nm or less. In some instances, the smallest cross-sectional dimension is about 200 nm or less, for example, about 100 nm or less, about 75 nm or less, about 70 nm or less, about 60 nm or less, about 50 nm or less, about 45 nm or less, about 40 nm or less, about 35 nm or less, about 20 nm or less, or about 10 nm or less. These dimensions can be measured using various methods, including direct measurement with an electron microscope of the transmission or secondary-electron type, or with atomic force microscopy. Herein, a primary particle dimension is considered to be the characteristic spatial dimension that a BET surface area measurement would interrogate by adsorbing gas onto exposed surfaces of the material. In the instance of a substantially fully-dense polycrystalline aggregate, it is the dimension of that aggregate. In the case of well-dispersed individual crystallites, it is the crystallite dimension. In the case of particles joined into a sintered network or a porous assembly of the particles, it is the cross-sectional thickness of the branches of the network, or the mean separation between pores that are open to the exterior of the assembly. In the case of an aggregated powder, the agglomerate may have an average crystallite size of less than about 800 nm, or less than about 600 nm, or less than about 500 nm, or less than about 300 nm. In some embodiments, the nanoscale material is a thin film or coating, including a coating on a particle of any size, in which the film or coating has an average thickness of about 100 nm or less, in some cases about 75 nm or less, for example, about 70 nm or less, about 60 nm or less, about 50 nm or less, about 45 nm or less, about 40 nm or less, or about 35 nm or less. The thickness of the film or coating can be measured by various methods including transmission electron microscopy or other microscopy methods that can view the film or coating in cross-section.

In some embodiments, the positive electrode includes a lithium-transition metal-phosphate compound as the electroactive material. The lithium-transition metal-phosphate compound may be optionally doped with a metal, metalloid, or halogen. The transition-metal compound has a markedly smaller particle size and much larger specific surface area than previously known positive active materials, such as $LiCoO_2$, $LiNiO_2$ or $LiMn_2O_4$ and, thus improved transport properties. In some embodiments, the positive electroactive material is an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material is a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05. In a typical battery, the electroactive material is $(Li_{1-x}Z_x)MPO_4$, where Z is Zr, Nb or Ti. Further embodiments of the lithium-transition metal-phosphate compound are described below.

In some embodiments, the alkali transition metal phosphates include those described in U.S. patent application Ser. No. 11/396,515. Examples include nanoscale ordered or partially disordered structures of the olivine $(A_xMPO_4)$, NASICON $(A_x(M',M'')_2(PO_4)_3)$, $VOPO_4$, $LiVPO_4F$, $LiFe(P_2O_7)$ or $Fe_4(P_2O_7)_3$ structure types, wherein A is an alkali ion, and M, M' and M'' are metals.

In one or more embodiments, the alkali transition metal phosphate composition has the formula $LiMPO_4$ (i.e., an olivine structure type), where M is one or more transition metals. In some embodiments, M is one or more of V, Cr, Mn, Fe, Co and Ni. In certain embodiments, the alkali transition metal phosphate composition is an ordered olivine $(Li_{1-x}MXO_4)$, where M is at least one first row transition metal (e.g., one or more of V, Cr, Mn, Fe, Co and Ni), and x can range from zero to one, during lithium insertion and deinsertion reactions. In some embodiments, M is Fe. In the as-prepared state, x is typically about one. In particular embodiments, the special properties of nanoscale ion storage materials may be augmented by doping with foreign ions, such as metals or anions. Such materials are expected to exhibit similar behavior to that demonstrated herein for $Li_{1-x}FePO_4$ at the nanoscale, based on the scientific principles underlying such behavior. However, doping is not required for a material to exhibit special properties at the nanoscale.

In other embodiments, there is some substitution of Li onto the M-site. In one embodiment, there is about 5 or 10% substitution of Li onto the Fe site. The lithium transition metal phosphate material has an overall composition of $Li_{1-x-z}M_{1-z}PO_4$, where M comprises at least one first row transition metal selected from the group consisting of Ti, V, Cr, Mn, Fe, Co and Ni, where x is from 0 to 1 and z can be positive or negative. In some embodiments, M includes Fe, and z is between about 0.15 and −0.15. The material can exhibit a solid solution over a composition range of 0<x<0.30, for example 0<x<0.15. In some embodiments, the material exhibits a stable solid solution over a composition range of x between 0 and at least about 0.15. In some embodiments, the material exhibits a stable solid solution over a composition range of x between 0 and at least about 0.07 or between 0 and at least about 0.05 at room temperature (22-25° C.). The material can also exhibit a stable solid solution at low lithium content; e.g., where 1<x<0.8 or where 1<x<0.9, or where 1<x<0.95.

In some embodiments, the positive electroactive material has a lithium-rich transition metal phosphate phase and a lithium-poor transition metal phosphate phase. For example, in some embodiments, the lithium-rich transition metal phosphate phase has the composition $Li_yMPO_4$ and the lithium-poor transition metal phosphate phase has the composition $Li_{1-x}MPO_4$, and 0.02<y<0.2 and 0.02>x>0.3 at room temperature (22-25° C.). In one or more embodiments, the material can exhibit a solid solution over a composition range of $0<x<0.15$ and $0.02<y<0.10$.

In some embodiments, the nanoscale positive electrode electroactive materials are also based on the alkali transition metal phosphates, such as those described in U.S. patent application Ser. No. 10/329,046. For example, in one embodiment, the electroactive material has an overall composition of $Li_xFe_{1-a}M''_aPO_4$, and a conductivity at 27° C., of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, in some cases, at least about $10^{-3}$ S/cm, and in other cases, at least about $10^{-2}$ S/cm.

In some embodiments, the alkali transition metal phosphate composition has an overall composition of $Li_xFe_{1-a}M''_aPO_y$, the compound having a gravimetric capacity of at least about 80 mAh/g while the device is charging/discharging at greater than about C rate. However, in some embodiments, the capacity is at least about 100 mAh/g, or in other embodiments, at least about 120 mAh/g, in some embodiments, at least about 150 mAh/g, and in still other embodiments, at least about 160 mAh/g. The present invention can, in some embodiments, also provide a capacity up to the theoretical gravimetric capacity of the compound.

In another embodiment, the alkali transition metal phosphate composition has an overall composition of $Li_{x-a}M''_{a}FePO_4$.

In another embodiment, the alkali transition metal phosphate composition has an overall composition of $Li_{x-a}M''_{a}FePO_4$, and a conductivity at 27° C. of at least about $10^{-8}$ S/cm. However, in some cases, the conductivity is at least about at least about $10^{-7}$ S/cm, in other cases, at least about $10^{-6}$ S/cm, in yet other cases, at least about $10^{-5}$ S/cm, in still other cases, at least about $10^{-4}$ S/cm, and in some cases, at least about $10^{-3}$ S/cm, and in further cases, at least about $10^{-2}$ S/cm.

In another embodiment, the alkali transition metal phosphate composition has an overall composition of $Li_{x-a}M''_{a}FePO_4$, the compound having a gravimetric capacity of at least about 80 mAh/g while the device is charging/discharging at greater than about C rate. However, in some embodiments, the capacity is at least about 100 mAh/g, or in other embodiments, at least about 120 mAh/g; in some embodiments, at least about 150 mAh/g and in still other embodiments, at least about 170 mAh/g. The present invention can, in some embodiments, also provide a capacity up to the theoretical gravimetric capacity of the compound.

According to one embodiment, a composition comprising a compound with a formula $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, has a conductivity at about 27° C. of at least about $10^{-8}$ S/cm, wherein A is at least one of an alkali metal and hydrogen, M' is a first-row transition metal, X is at least one of phosphorus, sulfur, arsenic, molybdenum and tungsten, M" is any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0001<a\leq0.1$, and x, y, and z have values such that x plus the quantity $y(1-a)$ times a formal valence or valences of M', plus the quantity ya times a formal valence or valence of M", is equal to z times a formal valence of the $XD_4$, $X_2D_7$, or $DXD_4$ group. x, y, and z are typically greater than 0. The conductivity of the compound can be at least about $10^{-5}$ S/cm, at least about $10^{-4}$ S/cm, and, in some cases, at least about $10^{-2}$ S/cm. In some embodiments, A is lithium and $x/(x+y+z)$ can range from about zero to about one third, or about zero to about two thirds. In one embodiment, X is phosphorus, while in other embodiments, M' is iron. M" can be any of aluminum, titanium, zirconium, niobium, tantalum, tungsten, or magnesium. M" can be substantially in solid solution in the crystal structure of the compound. Typically, the compound has at least one of an olivine (e.g., $AMPO_4$), NASICON (e.g., $A_2M_2(PO_4)_3$), $VOPO_4$, $LiFe(P_2O_7)$ or $Fe_4(P_2O_7)_3$ structure, or mixtures thereof.

In some embodiments, the nanoscale electrode compound is $LiFePO_4$.

In some embodiments, M" is at least partially in solid solution in the crystal structure of the compound at a concentration of at least 0.01 mole % relative to the concentration of M', the balance appearing as an additional phase, at least 0.02 mole % relative to the concentration of M', the balance appearing as an additional phase, and in yet other embodiments, at least 0.05 mole % relative to the concentration of M', the balance appearing as an additional phase and, in still other embodiments, at a concentration of at least 0.1 mole % relative to the concentration of M', the balance appearing as an additional phase.

In some cases, the alkali transition metal phosphate composition has an overall composition of $(A_{1-a}M''_a)_xM'_y(XD_4)_z$, $(A_{1-a}M''_a)_xM'_y(DXD_4)_z$, or $(A_{1-a}M''_a)_xM'_y(X_2D_7)$, and has a conductivity at 27° C. of at least about $10^{-8}$ S/cm, wherein A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen, $0.0002<a>0.1$, and x, y, and z have values such that $(1-a)_x$ plus the quantity ax times the formal valence or valences of M" plus y times the formal valence or valences of M' is equal to z times the formal valence of the $XD_4$, $X_2D_7$ or $DXD_4$ group x, y, and z are typically greater than zero. The conductivity of the compound can be at least about $10^{-5}$ S/cm, at least about $10^{-4}$ S/cm, and, in some cases, at least about $10^{-2}$ S/cm. In some embodiments, A is lithium and $x/(x+y+z)$ can range from about zero to about one third. In one embodiment, X is phosphorus, while in other embodiments, M' is iron. M" can be any of aluminum, titanium, zirconium, niobium, tantalum, tungsten, or magnesium. M" can be substantially in solid solution in the crystal structure of the compound. Typically, the compound has at least one of an olivine, NASICON, $VOPO_4$, $LiFe(P_2O_7)$ or $Fe_4(P_2O_7)_3$ structure, or mixtures thereof. In some embodiments, the compound is $LiFePO_4$. In some embodiments, M" is at least partially in solid solution in the crystal structure of the compound at a concentration of at least 0.01 mole % relative to the concentration of M', the balance appearing as an additional phase, at least 0.02 mole % relative to the concentration of M', the balance appearing as an additional phase, and in yet other embodiments, at least 0.05 mole % relative to the concentration of M', the balance appearing as an additional phase and, in still other embodiments, at a concentration of at least 0.1 mole % relative to the concentration of M', the balance appearing as an additional phase.

In some embodiments, the alkali transition metal phosphate composition has a suitable electronic conductivity greater than about $10^{-4}$ S/cm. The alkali transition metal phosphate composition can be a composition of $Li_x(M_{1-a}M''_a)PO_4$ or $L_{x-a}M''_aM'PO_4$, and can crystallize in the ordered-olivine or triphylite structure, or a structure related to the ordered olivine or triphylite structure with small displacements of atoms without substantial changes in the coordination number of anions around cations, or cations around anions. In such compounds $Li^+$ substantially occupies the octahedral site typically designated as M1, and a substantially divalent cation M' substantially occupies the octahedrally-coordinated site typically designated as M2, as described in the olivine structure given in "Crystal Chemistry of Silicate Minerals of Geophysical Interest," by J. J. Papike and M. Cameron, *Reviews of Geophysics and Space Physics*, Vol. 14, No. 1, pages 37-80, 1976. In some embodiments, the exchange of Li and the metal M' between their respective sites in a perfectly ordered olivine structure is allowed so that M' may occupy either site. M' is typically one or more of the first-row transition metals, V, Cr, Mn, Fe, Co, or Ni. M" is typically a metal with formal valence greater than I+ as an ion in the crystal structure.

In some embodiments, M', M", x, and a are selected such that the nanoscale material is a crystalline compound that has in solid solution charge compensating vacancy defects to preserve overall charge neutrality in the compound. In the compositions of type $Li_x(M_{1-a}M''_a)PO_4$ or $Li_{x-a}M''_aM'PO_4$, this condition can be achieved when a times the formal valence of M" plus (1-a) times the formal valence of M' plus x is greater than 3+, necessitating an additional cation deficiency to maintain charge neutrality, such that the crystal composition is $Li_x(M'_{1-a-y}M''_a vac_y)PO_4$ or $Li_{x-a}M''_aM'_y vac_y PO_4$, where vac is a vacancy. In the language of defect chemistry, the dopant can be supervalent and can be added under conditions of temperature and oxygen activity that promote ionic compensation of the donor, resulting in nonstoichiometry. The vacancies can occupy either M1 or M2 sites. When x<1, the compound also has additional cation vacancies on the M1 site in a crystalline solid solution, said vacancies being compensated by increasing the oxidation state of M" or M'. In order to increase the electronic conductivity usefully, a suitable concentration of said cation vacancies should be greater than or equal to $10^{18}$ per cubic centimeter.

In some cases, the alkali transition metal phosphate composition has an olivine structure and contains in crystalline solid solution, amongst the metals M' and M", simultaneously the metal ions $Fe^{2+}$ and $Fe^{3+}$, $Mn^{2+}$ and $Mn^{3+}$, $Co^{2+}$ and $Co^{3+}$, $Ni^{2+}$ and $Ni^{3+}$, $V^{2+}$ and $V^{3+}$, or $Cr^{2+}$ and $Cr^{3+}$, with the ion of lesser concentration being at least 10 parts per million of the sum of the two ion concentrations.

In some embodiments, the alkali transition metal phosphate composition has an ordered olivine structure and A, M', M", x, and a are selected such that there can be Li substituted onto M2 sites as an acceptor defect. In the compositions of type $Li_x(M'_{1-a}M''_a)PO_4$ or $Li_{x-a}M''_aM'PO_4$, typical corresponding crystal compositions are $Li_x(M'_{1-a-y}M''_aLi_y)PO_4$ or $Li_{x-a}M''_aM'_{1-y}Li_yPO_4$. In this instance, the subvalent Li substituted onto M2 sites for M' or M" can act as an acceptor defect. In order to increase the electronic conductivity usefully, a suitable concentration of said Li on M2 sites should be greater than or equal to $10^{18}$ per cubic centimeter.

In some embodiments, the nanoscale electrode material is a p-type semiconducting composition, for example $Li_x(M'_{1-a}M''_a)PO_4$, $Li_xM''_aM'PO_4$, $Li_x(M'_{1-a-y}M''_a vac_y)PO_4$, $Li_{x-a}M''_aM'_{1-y}vac_yPO_4$, $Li_x(M'_{1-a-y}M''_aLi_y)PO_4$ or $Li_{x-a}M''_aM'_{1-y}Li_yPO_4$. M" is a group IIA, IIIA, IVA, VA, VIA, VIIA, VIIIA, IB, IIB, IIIB, IVB, VB, and VIB element of the Periodic Table (catalog number S-18806, published by the Sargent-Welch company in 1994). Magnesium is an example of a dopant from Group IIA, Y is an example of a dopant from Group IIIA, Ti and Zr are examples of dopants from Group IVA, Nb and Ta are examples of dopants from Group VA, W is an example of a dopant from Group VIA, Fe is an example of a metal from Group VIIIA, and Al is an example of a dopant from Group IIIB.

In the alkali transition metal phosphate compositions described herein, x can have a value between zero and 1.1 in the initially prepared material. During its use as a lithium ion storage compound, x can vary between about zero and about 1.1. In the nanoscale materials described herein, a can have a value between about 0.0001 and 0.1. In some embodiments, out of the total amount a of M", at least 0.0001 is in solid solution in the crystalline structure of the compound.

In some embodiments, M' is Fe and the solubility of M" in the lattice can be improved if M" has an ionic radius, in octahedral coordination, that is less than that of $Fe^{2+}$. Achieving solid solubility sufficient to increase the electronic conductivity above $10^{-8}$ S/cm can require that processing conditions (for example, temperature, atmosphere, starting materials) allow M" to be stabilized in a particular valence state that would provide an ionic radius less than that of $Fe^{2+}$. In some cases, for example, when solid solubility is achieved, the M" ion may occupy the M1 site, or it may preferentially occupy the M2 site and cause $Fe^{2+}$ or $Fe^{3+}$, which would normally occupy the M2 site, to occupy the M1 site.

Generalizing the M" solubility requirement to other olivines of composition $Li_{x-a}M''_aM'PO_4$, M" typically has an ionic radius that is less than the average ionic radius of ions M' at the Li concentration x at which the compound is first synthesized.

Electrochemical insertion and removal can later change the valence distribution amongst the M' and M" ions. In some cases, M" can be in the desired valence state and concentration by adding, to the starting material, a salt of M" having the desired final valence. However, the desired valence distribution amongst metals M' and M" can be obtained by synthesizing or heat treating under appropriate conditions of temperature and gas atmosphere. For example, if M' is Fe, heat treatment should be conducted under temperature and atmosphere conditions that preserve a predominantly 2+ valence state, although some $Fe^{3+}$ is allowable and can even be beneficial for increasing conductivity.

In other cases, for example, for $Li_x(M_{1-a}M''_a)PO_4$ compositions, firing or heat treating at 600° C., can render the compositions conductive, even if M", or M', is a divalent cation, such as $Mg^{2+}$ or $Mn^{2+}$. In some cases, a $Li_3PO_4$ secondary phase can be present. Thus, the olivine composition according to some embodiments of the present invention may have a lithium deficiency that can result in a $Li_{x-a}M''_aM'PO_4$ crystal composition.

The possible dopants M" are not limited to those Groups of the Periodic Table that were previously identified, rather, M" can be any metal that satisfies the above requirements of size and valence. Specifically, for compositions $Li_{x-a}M'_aM''PO_4$, where M' is Fe, M" may be $Mg^{2+}$, $Mn^{2+}$, $Fe^{3+}$, $Al^{3+}$, $Ce^{3+}$, $Ti^{4+}$, $Zr^{4+}$, $Hf^{4+}$, $Nb^{5+}$, $Ta^{5+}$, $W^{4+}$, $W^{6+}$, or combinations thereof.

Doped alkali transition metals phosphate compositions may be prepared from starting materials of alkali salts, metal compounds and phosphorous salts including, but not limited to, lithium carbonate, ammonium phosphate and iron oxalate, to which a low additional concentration of dopant metal such as Mg, Al, Ti, Fe, Mn, Zr, Nb, Ta and W have been added, typically as a metal oxide or metal alkoxide. The powder mixture is heated under a low oxygen environment at a temperature of 300° C. to 900° C. These compounds exhibit increased electronic conductivity at and near room temperature, which is particularly advantageous for their use as lithium storage materials. Further details regarding the composition and preparation of these compounds are found in U.S. application Ser. No. 10/329,046, which is incorporated herein in its entirety by reference.

In certain embodiments, the nanoscale electroactive materials described herein are prepared from conventional materials by size-reduction processes (e.g., milling) to reduce the particle dimensions into the desired range. However, this can be a highly energy-intensive process. Thus, the materials also can be synthesized in the nanoscale state, by methods including, but not limited to, solid-state reactions between metal salts, wet-chemical methods, such as co-precipitation, spray-pyrolysis, mechanochemical reactions, or combinations thereof. Nanoscale materials with the desired particle sizes and specific surface areas are obtained by using homogeneous reactants, minimizing the reaction or crystallization temperature (in order to avoid particle coarsening), and avoiding formation of liquid phases in which the product is highly soluble (which also tends to lead to particle coarsening). Specific processing conditions can typically be established for a given process without undue experimentation by those skilled in the art. Further details regarding the composition and preparation of these compounds are found in U.S. patent application Ser. No. 11/396,515.

In some embodiments, nanoscale electroactive materials are prepared by non-equilibrium, moderate temperature techniques, such as wet-chemical or low temperature solid-state reactions or thermochemical methods. The materials thus prepared can acquire properties such as increased nonstoichiometry and disorder and increased solubility for dopants because they are synthesized in a metastable state or because kinetic pathways to the final product differ from those in conventional high temperature processes. Such disorder in the nanoscale form can also be preserved substantially under electrochemical use conditions and provide benefits as described herein.

In another embodiment of the present invention, the electroactive material of the positive electrode includes a material that, while of high electronic conductivity, does not vary its conductivity by more than a factor of five, or factor of two, over the entire charge cycle. This feature of the Li-ion cell is contrasted with conventional electroactive positive electrode materials such as $LiCoO_2$, $LiNiO_2$ or $LiMn_2O_4$ for which conductivity increases dramatically once delithiation during charging occurs. The dramatic increase in conductivity of the electroactive material of the positive electrode contributes to a decrease in impedance. In contrast, an electroactive material of the present cells exhibits only moderate increases in conductivity, so that its contribution to impedance is more moderate.

In some embodiments, the cathode further includes a conductive additive, i.e., an additional phase that does not substantially store ions, but may provide added electrical conductivity. A conductive additive such as carbon or a metallic phase is included in the electrode layer in order to improve its electrochemical stability, reversible storage capacity, or rate capability. Such additional phases include, for example, carbon, a metal, or an intermetallic phase, such as a metal phosphide, metal carbide, metal nitride, or mixed intermetallic compound, such as metal carbide-nitride or metal carbide-phosphide. Further exemplary conductive additives include graphite, carbon black, acetylene black, vapor grown fiber carbon ("VGCF") and fullerenic carbon nanotubes. Conductive diluents are present in a range of less than about 5% by weight, or less than abut 3% by weight, for example about 1%-5% by weight of the total solid composition of the positive electrode.

The selection criteria for an anode are at two levels, the particle level and the electrode level. At the particle level, the particle size and the Li diffusion coefficient of the particle are selection criteria. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used. The carbonaceous material has a numerical particle size (measured by a laser scattering method) that is smaller than about 25 µm, or smaller than about 15 µm, or smaller than about 10 µm, or even less than or equal to about 6 µm. The smaller particle size reduces lithium diffusion distances and increases rate capability of the anode, which is a factor in preventing lithium plating at the anode. In those instances where the particle is not spherical, the length scale parallel to the direction of lithium diffusion is the figure of merit. Larger particle sized materials may be used if the lithium diffusion coefficient is high. The diffusion coefficient of MCMB is $\sim 10^{-10}$ cm$^2$/s. Artificial graphite has a diffusion coefficient of $\sim 10^{-8}$ cm$^2$/s. As a result larger particle size artificial graphite could be used, approximately equal to 15 microns times the square root of the ratio of the respective diffusivities (H. Yang et al., *Journal of Electrochemical Society*, 151 (8) A1247-A1250 (2004)).

In some embodiments, the negative active material consists of powder or particulates with a specific surface area measured using the nitrogen adsorption BET method to be greater than about 2 m$^2$/g, or 4 m$^2$/g, or even about 6 m$^2$/g. In some embodiments, the negative active material is nanoscale ion storage material as described herein.

On an electrode level, the active material and a conductive additive are combined to provide an electrode layer that permits rapid lithium diffusion throughout the layer. A conductive additive such as carbon or a metallic phase may also be included in the negative electrode. Exemplary conductive additives include carbon black, acetylene black, VGCF and fullerenic carbon nanotubes. Conductive diluents are present in a range of about 0%-5% by weight of the total solid composition of the negative electrode.

The negative electrode (anode) of the battery is manufactured by preparing a paste containing the negative active material, such as graphitic or non-graphitic carbon, and a conductive carbon additive homogeneously suspended in a solution of a polymer binder in a suitable casting solvent. The paste is applied as a uniform-thickness layer to a current collector and the casting solvent is removed by drying. A metallic substrate such as copper foil or grid is used as the negative current collector. To improve the adhesion of the active material to the collector, an adhesion promoter, e.g., oxalic acid, may be added to the slurry before casting. The binder used in the negative electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

At the electrode level, the negative electrode can have a thickness of less than 75 µm, e.g., between about 20 µm to 65 µm, or between about 40 µm to 55 µm on both sides of the current collector, and a pore volume fraction between about 20 and 40 vol %. The active material is typically loaded at about 5-20 mg/cm$^2$, or about 4-5 mg/cm$^2$.

A nonaqueous electrolyte is used and includes an appropriate lithium salt, such as, for example, LiPF$_6$, LiBF$_4$, LiAsF$_6$, or lithium bis(trifluoromethylsulfonimide) (LiTFMSI), dissolved in a nonaqueous solvent. One or more functional additives, such as, for example, CO$_2$, vinylene carbonate, ethylene sulfite, ethylene thiocarbonate, dimethyl dicarbonate, spirodicarbonate and propane sultone, can be included to modify the solid-electrolyte interface/interphase (SEI) that forms on the electrodes, particularly negative carbon electrodes. The electrolyte may be infused into a porous separator that spaces apart the positive and negative electrodes. In one or more embodiments, a microporous electronically insulating separator is used.

Numerous organic solvents have been proposed as the components of Li-ion battery electrolytes, notably a family of cyclic carbonate esters such as ethylene carbonate (EC), propylene carbonate (PC), butylene carbonate (BC), and vinylene carbonate (VC), and their chlorinated or fluorinated derivatives, and a family of acyclic dialkyl carbonate esters, such as dimethyl carbonate (DMC), diethyl carbonate (DEC), ethylmethyl carbonate (EMC), dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include γ-BL, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate and the like. These nonaqueous solvents are typically used as multicomponent mixtures.

A solid or gel electrolyte may also be employed. The electrolyte may be an inorganic solid electrolyte, e.g., LiN or LiI, or a high molecular weight solid electrolyte, such as a gel, provided that the materials exhibits lithium conductivity. Exemplary high molecular weight compounds include poly(ethylene oxide), poly(methacrylate) ester based compounds, or an acrylate-based polymer, and the like.

As the lithium salt, at least one compound from among LiClO$_4$, LiPF$_6$, LiBF$_4$, LiSO$_3$CF$_3$, LiN(SO$_2$CF$_3$)$_2$, LiN(SO$_2$CF$_2$CF$_3$)$_2$ and the like are used. The lithium salt is at a concentration from about 0.5 to about 1.5 M, for example, from about 1.0 to about 1.3 M.

Figure 2:
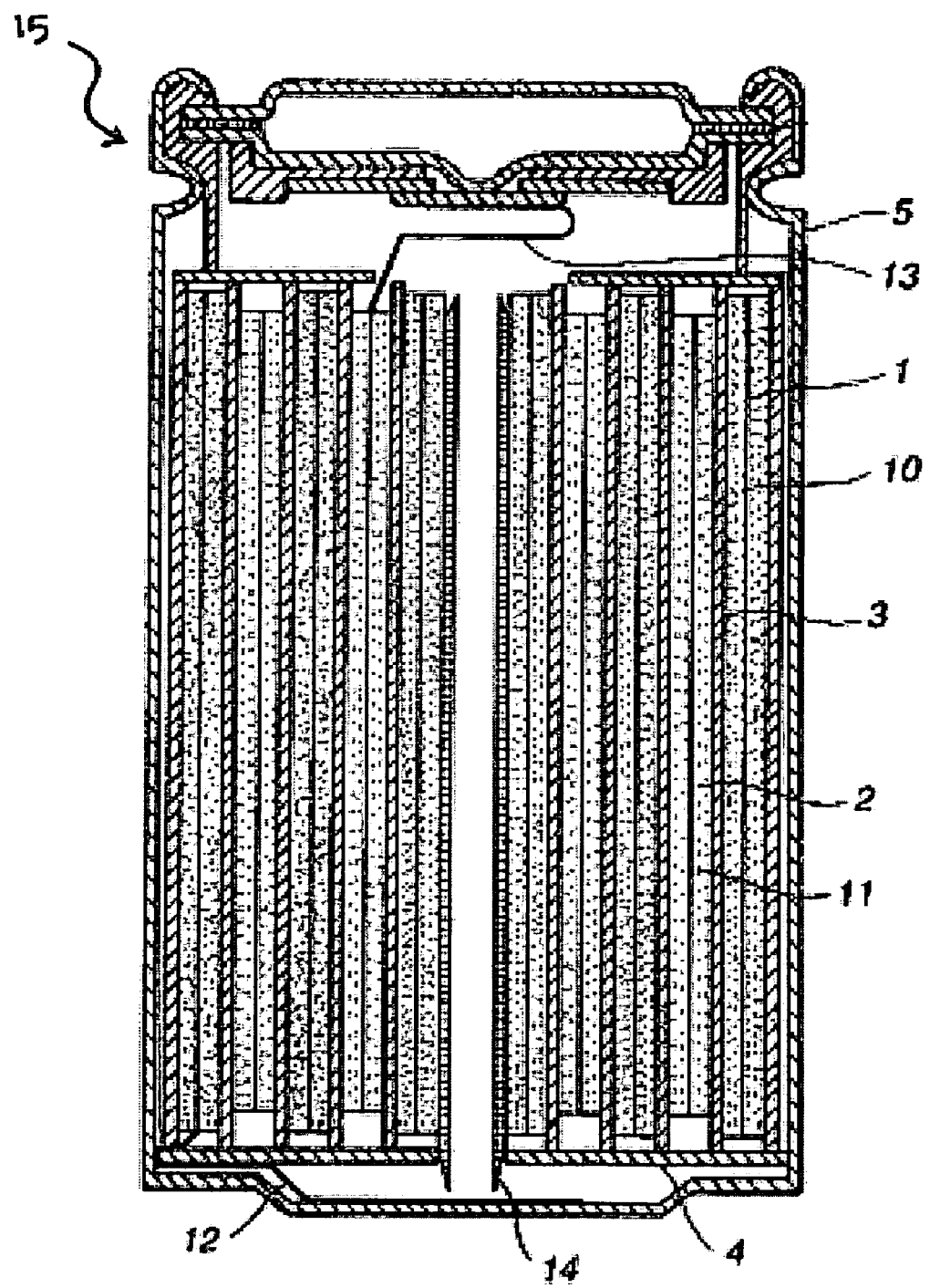
FIG. 2 is a cross-sectional view showing an exemplary lithium secondary cell having spirally wound electrodes.

Nonaqueous electrolyte secondary batteries formed with the electrodes described above are also provided by the invention. In one embodiment, the nonaqueous electrolyte secondary battery includes a battery element having an elongated cathode and an elongated anode, which are separated by two layers of an elongated microporous separator which are tightly wound together and placed in a battery can. A typical spiral electrode secondary cell is shown in FIG. 2 (reproduced from U.S. Pat. No. 6,277,522, which is incorporated by reference). The secondary cell 15 includes a double layer of anode material 1 coated onto both sides of an anode collector 10, a separator 3 and a double layer of cathode material 2 coated onto both sides of cathode collector 11 that have been stacked in this order and wound to make a spiral form. The spirally wound cell is inserted into a battery can 5 and insulating plates 4 are disposed at upper and lower surfaces of the spirally wound cell. A cathode lead 13 from anode collector 11 provides electrical contact with cover 7. An anode lead 12 is connected to the battery can 5. An electrolytic solution is added to the can.

In one embodiment, a Li-ion battery is formed from the positive and negative electrodes. In one embodiment, the battery is formed in a jelly-roll shape. In this embodiment, the above described positive electrode is brought into intimate contact with the negative electrode through the separator layers, which are then spirally wound a number of times around a small-diameter mandrel to form the jelly-roll electrode-separator assembly. Next, the jelly-roll structure is inserted into a battery can, for example, made of nickel-plated steel or aluminum, current collector tabs are spot-welded to the battery can and can header, which is preferably equipped with a variety of safety features, such as positive-temperature coefficient elements, pressure burst disks, etc. Alternatively, uncoated regions can be created along the edge of the electrode, thereby exposing bare metal foil. One or preferably more metal foil strips or tabs, between about 0.4 and about 0.8 cm wide, can be attached to these bare regions using an ultrasonic welder. These tabs can then be attached to the can or header using an ultrasonic or spot (resistance) welder. The nonaqueous electrolyte, for example, including a solution of a lithium salt in a mixture of carbonate esters, is injected into the battery can, the can header is sealed to the battery can using a crimp seal or laser weld. An alternative cell design is described in U.S. patent application Ser. No. 11/515,597, filed on Sep. 5, 2006, entitled "Battery Cell Design and Method of Its Construction," which is incorporated by reference herein Although the particular embodiment of a Li-ion battery described here relates to a cylindrical cell, it is to be understood that the present invention is not limited to such a battery shape. In fact, other can shapes and sizes, such as square, rectangular (prismatic) coin, button or the like may be used.

Further, although the above description uses an example of a liquid type nonaqueous electrolyte Li-ion battery, it is to be understood that other types of non-aqueous electrolytes, such as those of gel or solid polymer type can be used to manufacture thin batteries of this invention, whose electrodes may be bonded to their respective separators and packaged in thin metal-polymer laminate film bags as an outer casing material.

EXAMPLES

Example 1

A sample of positive electrode current collector (Al foil) was coated on both sides with a composition of Electrodag 112 (Acheson, a National Starch and Chemical Company) (including carbon black, graphite, 2-butoxy-ethanol, water, and acrylic acid-isobutyl acrylate styrene polymer). After application to the current collector, the coating was allowed to dry for several minutes at an elevated temperature of 120° C. The coated current collector was then immersed for 1 min. with mild stirring movement in N-methylpyrrolidinone (NMP) solvent (Aldrich, Reagent Grade). Upon exposure to the NMP, the coating softened and a majority could easily be wiped clean from the current collector using a cotton swab dipped in the same NMP solution, revealing a clean metallic surface of aluminum foil.

In a second experiment, a coated current collector was prepared as described above. A cotton swab saturated with NMP solution was wiped across the surface of the coated collector. As before, a majority of the coating was easily wiped from the current collector.

Example 2

Standard battery grade aluminum foil with a thickness of 15 micron was prepared for electrode coating. An approximately 3 μm thick precoating of Electrodag 112 was applied to the foil, using micro gravure coating, and a loading of 0.7 g/m². The precoating coverage was approximately of 50%.

An electrode slurry in NMP was prepared from the following materials: 90% LiFePO$_4$ (nanoscale, as described herein) with a surface area of 30 m²/g; 5% carbon black; and 5% PVDF at a solids loading of 40% (all percentages are weight percentages).

The electrode slurry was coated onto the precoated foil (above) using a dr blade at a LiFePO$_4$ loading of 12 mg/cm² and allowed to dry in a 100° C. oven. For comparison, the electrode slurry was also coated onto battery grade aluminum foil that had not been precoated, also at a LiFePO$_4$ loading of 12 mg/cm² and allowed to dry in a 100° C. oven.

Each coated electrode was pressed to a thickness of 100 µm and bent around a 4 mm diameter mandrel. The electrode on the uncoated aluminum foil spalled off the foil as a result of the bend test, whereas the electrode on the precoated foil did not. Moreover, the through thickness impedance of the precoated electrode was 5 ohms as measured at 100 kgf/cm² at a sample size of 0.7 cm².

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. Accordingly, those skilled in the art would recognize that the use of an electrochemical device in the examples should not be limited as such. The present invention is directed to each individual feature, system, or method described herein. In addition, any combination of two or more such features, systems or methods, if such features, systems or methods are not mutually inconsistent, is included within the scope of the present invention.

We claim:

1. A nanocomposite electrode, comprising:
   a current collector;
   an electroactive layer comprising an electroactive material having a surface area of at least about 10 m²/g to about 50 m²/g and a binder; wherein the binder is selected from a group consisting of a polyvinylidene fluoride polymer, a copolymer thereof, and a terpolymer thereof; and
   a conductive adhesive layer contacting the surface of the current collector, wherein the conductive adhesive layer comprises a conductive adhesive selected from the group consisting of a polyolefin, a polyurethane, a polyacrylic acid, a polyacrylic ester, a polyether, a polyacrylate, a polystyrene, a copolymer thereof, a terpolymer thereof, and a mixture thereof; and
   an interlayer region interposed between the conductive adhesive layer and the electroactive layer and in electrical communication with the current collector and the electroactive layer, the interlayer region comprising a portion of the conductive adhesive layer intermixed with a portion of the electroactive layer.

2. The electrode of claim 1, wherein the conductive adhesive layer further comprises a conductive material and wherein a portion of the conductive material is located in the interlayer region.

3. The electrode of claim 1, wherein the electroactive layer is cast from a solvent-based composition and wherein the conductive adhesive is partially soluble in the casting solvent.

4. The electrode of claim 3, wherein the casting solvent is selected from the group consisting of N-methylpyrrolidinone (NMP), gamma-butyrolactone, dimethylformamide, acetone, methyl ethyl ketone and mixtures thereof.

5. The electrode of claim 3, wherein about 10% to about 90% of the conductive adhesive is extractable into the casting solvent.

6. The electrode of claim 1, wherein the conductive adhesive layer comprises a carbon-based composite.

7. The electrode of claim 6, wherein the carbon-based composite comprises conductive material and the conductive adhesive.

8. The electrode of claim 7, wherein the conductive material is selected from one or more of carbon black, natural and artificial graphite, partially graphitized coke, carbon fiber, vapor-phase grown carbon fibers, and carbon nanotubes and mixtures thereof.

9. The electrode of claim 1 wherein the conductive adhesive is an acrylic acid and styrene copolymer.

10. The electrode of claim 1 wherein the conductive adhesive is an acrylic acid, isobutyl acrylate styrene copolymer.

11. The electrode of claim 1, wherein the electroactive material has the surface area of at least about 15 m²/g.

12. The electrode of claim 1, wherein the electroactive material is an olivine compound having a composition Li$_x$M'$_y$M''$_a$(PO$_4$), wherein M' is selected from the group consisting of Group IIA, IIIA, IVA, VA, VIA, and IIIB and metals having an ionic radius less than the ionic radius of Fe$^{2+}$, x is equal to or greater than 0, and a and y are greater than 0.

13. The electrode of claim 12, wherein M' is Fe$^{2+}$.

14. The electrode of claim 12, wherein M'' is one or more metals selected from the group consisting of aluminum, titanium, zirconium, niobium, tantalum, tungsten, and magnesium.

15. The electrode of claim 12, wherein the compound is Li$_x$Fe$_y$M''$_a$PO$_4$, wherein x, y, and a are greater than 0.

16. The electrode of claim 12, wherein the compound is any of Li$_x$(M'$_{1-a}$M''$_a$)PO$_4$, (Li$_{1-a}$M''$_a$)$_x$M'$_y$PO$_4$, Li$_x$M''$_a$M'PO$_4$, Li$_x$(M'$_{1-a-y}$M''$_a$Li$_y$)PO$_4$, or Li$_{x-a}$M''$_a$M'$_{1-a}$Li$_y$PO$_4$, wherein $0.0001 < a \leq 0.1$.

17. The electrode of claim 1, wherein the electroactive layer further comprises a conductivity-enhancing additive.

18. The electrode of claim 17, wherein the conductivity-enhancing additive comprises carbon.

19. The electrode of claim 1, wherein the conductive adhesive covers about 20% to about 100% of the current collector surface.

20. The electrode of claim 1, wherein the conductive adhesive has a thickness from about 0.1 µm to about 20 µm.

21. The electrode of claim 1, wherein the interlayer region forms a gradient, wherein a concentration of the conductive adhesive layer is greater at an interface with the current collector than at an interface with the electroactive layer.

22. The electrode of claim 1, wherein the interlayer region forms a discreet layer interposed between the current collector and the electroactive layer.

23. The electrode of claim 1, wherein the electroactive layer has a thickness from about 50 µm to about 125 µm.

24. A lithium secondary cell, comprising:
   a lithium-containing positive electrode in electronic contact with a positive electrode current collector, the positive electrode current collector in electrical connection with an external circuit;
   a negative electrode in electronic contact with a negative electrode current collector, the negative electrode current collector in electrical connection with an external circuit; and an electrolyte in ionic contact with the positive and negative electrodes, wherein the positive electrode comprises an electroactive layer comprising an electroactive material having a surface area of at least about 10 m²/g to about 50 m²/g and a binder; wherein the binder is selected from a group consisting of a polyvinylidene fluoride polymer, a copolymer thereof, and a terpolymer thereof;

a conductive adhesive layer contacting the surface of the positive current collector, wherein the conductive adhesive layer comprises a conductive adhesive selected from the group consisting of a polyolefin, a polyurethane, a polyacrylic acid, a polyacrylic ester, a polyether, a polyacrylate, a polystyrene, a copolymer thereof, a terpolymer thereof, and a mixture thereof; and an interlayer region interposed between the conductive adhesive layer and the electroactive layer and in electrical communication with the positive current collector and the electroactive layer, the interlayer region comprising a portion of the conductive adhesive intermixed with a portion of the electroactive layer.

25. The lithium secondary cell of claim 24, wherein the conductive adhesive layer further comprises a conductive material and wherein a portion of the conductive material is located in the interlayer region.

26. The lithium secondary cell of claim 24, wherein the electroactive material is cast from a solvent-based composition and wherein the conductive adhesive is partially soluble in the casting solvent.

27. The lithium secondary cell of claim 26, wherein the casting solvent is selected from the group consisting of N-methylpyrrolidinone (NMP), gamma-butyrolactone, dimethylformamide, acetone, methyl ethyl ketone and mixtures thereof.

28. The lithium secondary cell of claim 26, wherein about 10% to about 90% of the conductive adhesive is extractable into the casting solvent.

29. The lithium secondary cell of claim 24, wherein the conductive adhesive layer comprises a carbon-based composite.

30. The lithium secondary cell of claim 29, wherein the carbon-based composite comprises conductive material and the conductive adhesive.

31. The lithium secondary cell of claim 30, wherein the conductive material is selected from one or more of carbon black, natural and artificial graphite, partially graphitized coke, carbon fiber, vapor-phase grown carbon fibers, and carbon nanotubes and mixtures thereof.

32. The lithium secondary cell of claim 30, wherein the conductive adhesive is an acrylic acid/styrene copolymer.

33. The lithium secondary cell of claim 24, wherein the electroactive material is an olivine compound having a composition $Li_xM'_yM''_a(PO_4)$, wherein M" is selected from the group consisting of Group IIA, IIIA, IVA, VA, VIA, and IIIB and metals having an ionic radius less than the ionic radius of $Fe^{2+}$;

x is equal to or greater than 0; and a and y are greater than 0.

34. The lithium secondary cell of claim 33, wherein M' is $Fe^{2+}$.

35. The lithium secondary cell of claim 33, wherein x has a value between zero and about 1, and y is about 1.

36. The lithium secondary cell of claim 33, wherein the compound is any of $Li_x(M'_{1-a}M''_a)PO_4$, $(Li_{1-a}M''_a)_xM'_yPO_4$, $Li_xM''_aM'PO_4$, $Li_x(M'_{1-a-y}M''_aLi_y)PO_4$, or $Li_{x-a}M''_aM'_{1-a}Li_yPO_4$, wherein $0.0001 < a \leqq 0.1$.

37. The lithium secondary cell of claim 33, wherein the compound is $Li_xFe_yM''PO_4$.

38. The lithium secondary cell of claim 24, wherein M" is one or more metals selected from the group consisting of aluminum, titanium, zirconium, niobium, tantalum, tungsten, and magnesium.

39. The lithium secondary cell of claim 24, wherein the electroactive layer further comprises a conductivity-enhancing additive.

40. The lithium secondary cell of claim 39, wherein the conductivity-enhancing additive comprises carbon.

41. The lithium secondary cell of claim 24, wherein the conductive adhesive covers about 20% to about 100% of the current collector surface.

42. The lithium secondary cell of claim 24, wherein the conductive adhesive layer has a thickness from about 0.1 μm to about 20 μm.

43. The lithium secondary cell of claim 24, wherein the interlayer region forms a gradient, wherein a concentration of the conductive adhesive layer is greater at an interface with the current collector than at an interface with the electroactive layer.

44. The lithium secondary cell of claim 24, wherein the interlayer region forms a discreet layer interposed between the current collector and the electroactive layer.

45. The lithium secondary cell of claim 24, wherein the electroactive layer has a thickness from about 50 μm to about 125 μm.

46. A process for preparing a lithium-containing electrode, comprising:

applying a conductive adhesive layer to one or more surfaces of a current collector, forming a current collector coated with an adhesive layer, wherein the conductive adhesive layer comprises a conductive adhesive selected from the group consisting of a polyolefin, a polyurethane, a polyacrylic acid, a polyacrylic ester, a polyether, a polyacrylate, a polystyrene, a copolymer thereof, a terpolymer thereof, and a mixture thereof;

applying an electroactive layer composition to one or more surfaces of the coated current collector, the electroactive layer composition comprising electroactive material, a binder and electrode casting solvent, wherein the electroactive material has a surface area of at least about 10 m²/g to about 50 m²/g and the binder is selected from a group consisting of a polyvinylidene fluoride polymer, a copolymer thereof, and a terpolymer thereof; wherein about 10% to about 90% of the conductive adhesive is extracted into the electrode casting solvent; and a portion of the high surface area electroactive material intermixes with the conductive adhesive to form an interlayer region interposed between the conductive adhesive layer and the electroactive layer and in electrical communication with the coated current collector and the remainder of the high surface area electroactive material, the interlayer region comprising a portion of the conductive adhesive layer intermixed with a portion of the electroactive layer.

47. The process of claim 46, wherein the conductive adhesive is partially soluble in the casting solvent.

48. The process of claim 46, wherein the conductive adhesive layer further comprises a conductive material and wherein a portion of the conductive material is located in the interlayer region.

49. The process of claim 46, wherein the conductive adhesive layer comprises a carbon-based composite.

50. The process of claim 49, wherein the carbon-based composite comprises conductive material and the conductive adhesive.

51. The process of claim 50, wherein the conductive material is selected from one or more of carbon black, natural and artificial graphite, partially graphitized coke, carbon fiber, vapor-phase grown carbon fibers, and carbon nanotubes and mixtures thereof.

52. The process of claim 50, wherein the conductive adhesive is acrylic acid/styrene copolymer.

53. The process of claim 50, wherein the casting solvent is selected from the group consisting of N-methylpyrrolidinone (NMP), gamma-butyrolactone, dimethylformamide, acetone, methyl ethyl ketone and mixtures thereof.

54. The process of claim 50, wherein the electroactive material is an olivine compound having a composition $Li_xM'_yM''_a(PO_4)$, wherein M" is selected from the group consisting of Group IIA, IIIA, IVA, VA, VIA, and IIIB and metals having an ionic radius less than the ionic radius of $Fe^{2+}$;

x is equal to or greater than 0; and a and y are greater than 0.

55. The process of claim 54, wherein M' is $Fe^{2+}$.

56. The process of claim 54, wherein M" is one or more metals selected from the group consisting of aluminum, titanium, zirconium, niobium, tantalum, tungsten, and magnesium.

57. The process of claim 54, wherein the compound is $Li_xFe_yM''_aPO_4$, wherein x, y, and a are greater than 0.

58. The process of claim 54, wherein the compound is any of $Li_x(M'_{1-a}M''_a)PO_4$, $(Li_{1-a}M''_a)_xM'_yPO_4$, $Li_xM''_aM'PO_4$, $Li_x(M'_{1-a-y}M''_aLi_y)PO_4$, or $Li_{x-a}M''_aM'_{1-a}Li_yPO_4$, wherein $0.0001 < a \leq 0.1$.

59. The process of claim 50, wherein the electroactive layer further comprises a conductivity-enhancing additive.

60. The process of claim 59, wherein the conductivity-enhancing additive comprises carbon.

61. The process of claim 50, wherein the conductive adhesive layer covers about 20% to about 100% of the current collector surface.

62. The process of claim 50, wherein the conductive adhesive layer has a thickness from about 0.1 µm to about 20 µm.

63. The process of claim 50, wherein the interlayer region forms a gradient, wherein a concentration of the conductive adhesive is greater at an interface with the current collector than at an interface with the electroactive layer.

64. The process of claim 50, wherein the interlayer region forms a discreet layer interposed between the current collector and the electroactive layer.

65. The process of claim 50, wherein the electroactive layer has a thickness from about 50 µm to about 125 µm.

66. The process of claim 46, wherein the electrode casting solvent is selected from the group consisting of N-methylpyrrolidinone (NMP), gamma-butyrolactone, dimethylformamide, acetone, methyl ethyl ketone and mixtures thereof.

* * * * *